US009083926B2

(12) United States Patent
Nejat et al.

(10) Patent No.: US 9,083,926 B2
(45) Date of Patent: Jul. 14, 2015

(54) MULTI-DISPLAY DEVICE AND METHOD THEREFORE

(75) Inventors: Mahyar Nejat, La Jolla, CA (US); William Clay, San Diego, CO (US)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 12/911,460

(22) Filed: Oct. 25, 2010

(65) Prior Publication Data

US 2012/0099029 A1 Apr. 26, 2012

(51) Int. Cl.

| | |
|---|---|
| ***H04N 5/66*** | (2006.01) |
| ***H04N 5/64*** | (2006.01) |
| ***H04N 9/12*** | (2006.01) |
| ***G06F 3/14*** | (2006.01) |

(52) U.S. Cl.
CPC ................ *H04N 5/64* (2013.01); *G06F 3/1431* (2013.01); *G09G 2300/02* (2013.01); *G09G 2360/04* (2013.01); *G09G 2370/14* (2013.01)

(58) Field of Classification Search
CPC .............. H04N 5/64; H04N 5/66; H04N 9/12
USPC .................................. 348/739, 840, 836, 839
See application file for complete search history.

(56) References Cited

U.S. PATENT DOCUMENTS

| | | | | |
|---|---|---|---|---|
| 5,949,643 | A | 9/1999 | Batio | |
| RE42,091 | E * | 2/2011 | Moscovitch et al. | 361/679.04 |
| 2004/0150581 | A1 | 8/2004 | Westerinen et al. | |

FOREIGN PATENT DOCUMENTS

| | | | |
|---|---|---|---|
| CN | 1264054 | A | 8/2000 |
| CN | 1411573 | A | 4/2003 |
| CN | 101355640 | A | 1/2009 |

OTHER PUBLICATIONS

Atronis Technology Co. Ltd., Dual 7 Inch Screen Portable DVD Player, no date, <http://atronis.en.allbaba.com/product/259756652-209693254/Dual_7_inch_screen_Portable_DVD_player.html>.

First Office Action for Application No. 201110319590.0 mailed from the State Intellectual Property Office of the People's Republic of China on Nov. 25, 2013.

* cited by examiner

*Primary Examiner* — Geepy Pe
(74) *Attorney, Agent, or Firm* — Fitch, Even, Tabin & Flannery LLP

(57) ABSTRACT

A multi-display device comprising: a plurality of display panels wherein each display panel is arranged in a housing; and a single video processor arranged within one of the housings and configured to output a different video signal to each of the plurality of display panels.

15 Claims, 7 Drawing Sheets

MULTI-DISPLAY DEVICE AND METHOD THEREFORE

FIELD

The present patent document relates to multi-display devices and methods therefore.

BACKGROUND

As the cost of display devices such as liquid crystal displays (LCDs) and plasma displays comes down in price, more display devices are being integrated into our daily lives. For example, bars and other businesses are placing more displays on their walls. Offices often have multiple display devices mounted on their walls. Conference rooms are using multiple display devices for video conferencing and presentations. Doctors and other professionals are upgrading their equipment with extra displays to allow them to see multiple views while they work and more business are using display devices for advertisements.

Multiple displays are now often found in situations where one display was adequate but two or more displays would be advantageous. Multiple displays may allow people to watch more than one event simultaneously. In addition, multiple displays may allow doctors or other professionals to simultaneously see more than one view of what they are working on.

However, mounting multiple displays can pose a problem if space is limited. Furthermore, despite the fact that the price of display devices has fallen considerably in recent times, buying two display devices is still twice the cost of buying a single display device.

SUMMARY OF THE EMBODIMENTS

In view of the foregoing, an object according to one aspect of the present patent document is to provide improved multi-display devices and methods therefore. Preferably the multi-display devices and methods address, or at least ameliorate one or more of the problems described above. To this end, a multi-display device is provided. In one embodiment, the multi-display device comprises: a plurality of display panels wherein each display panel is arranged in a housing; and a single video processor arranged within one of the housings and configured to output a different video signal to each of the plurality of display panels.

In another embodiment, the multi-display device further comprises a single chassis arranged within one of the housings, wherein the single video processor is arranged on the chassis and wherein the chassis is configured to output an individual video signal to each of the plurality of display panels.

In yet another embodiment, the multi-display device further comprises a first digital demodulator arranged on the chassis and configured to output to the single video processor. In a further embodiment, the multi-display device further comprises a second digital demodulator arranged on the chassis and configured to output to the single video processor. In at least one embodiment the first digital demodulator and the second digital demodulator are configured to demodulate different modulation schemes.

In another embodiment, the multi-display device further comprises a plurality of inputs arranged on at least one housing wherein the single video processor is configured to allow selective output of the plurality of inputs to each of the plurality of display panels.

In yet another embodiment, the multi-display device further comprises a first plurality of inputs arranged on at least one housing and configured to output to a first display panel; and a second plurality of inputs arranged on the at least one housing and configured to output to a second display panel.

In another embodiment, the multi-display device further comprises a mechanical backing structure having a first display mounted thereon, wherein the mechanical backing structure includes a pivotally connected portion with a second display mounted thereon and wherein, the pivotally connected portion is configured to allow the first and second display panels to be oriented in a side-by-side configuration and to allow the first and second display panels to be oriented in a one in front of the other configuration. In another embodiment, the pivotally connected portion is configured to allow a one above the other configuration.

In yet another embodiment, the plurality of display panels includes a first liquid crystal display panel and a second liquid crystal display panel.

In another embodiment, a multi-display device is provide; the multi-display device comprises: a first display panel arranged in a first housing; a second display panel arranged in a second housing; and a single chassis arranged within the first housing and configured to output a different video signal to the first display panel and the second display panel.

In another embodiment, the multi-display device further comprises a single system on a chip arranged on the chassis and configured to output a plurality of individual video signals.

In yet another embodiment, a method of supporting multiple displays is provided. The method comprises the steps of receiving at least one input video signal by a single chassis contained within a first display housing; demultiplexing the video signal into at least two output video signals; outputting a first video signal to a first display panel from the single chassis; and outputting a second video signal to a second display panel from the single chassis.

In one embodiment of the method the chassis processes the first video signal and the second video signal with a single video processor.

The embodiments of the multi-display device and associated methods are described more fully below. Further aspects, objects, desirable features, and advantages of the multi-display device and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE EMBODIMENTS

Consistent with its ordinary meaning, the term "display device" is used herein to refer to an output device for presentation of information for visual, tactile or auditive reception, acquired, stored, or transmitted in various forms. "Display device" includes electronic displays in which the input signal is supplied in an electronic form. By way of example "display device" includes but is not limited to televisions, monitors, liquid crystal displays (LCDs), plasma display panels (PDPs) and electronic paper displays, to name a few.

Figure 1:
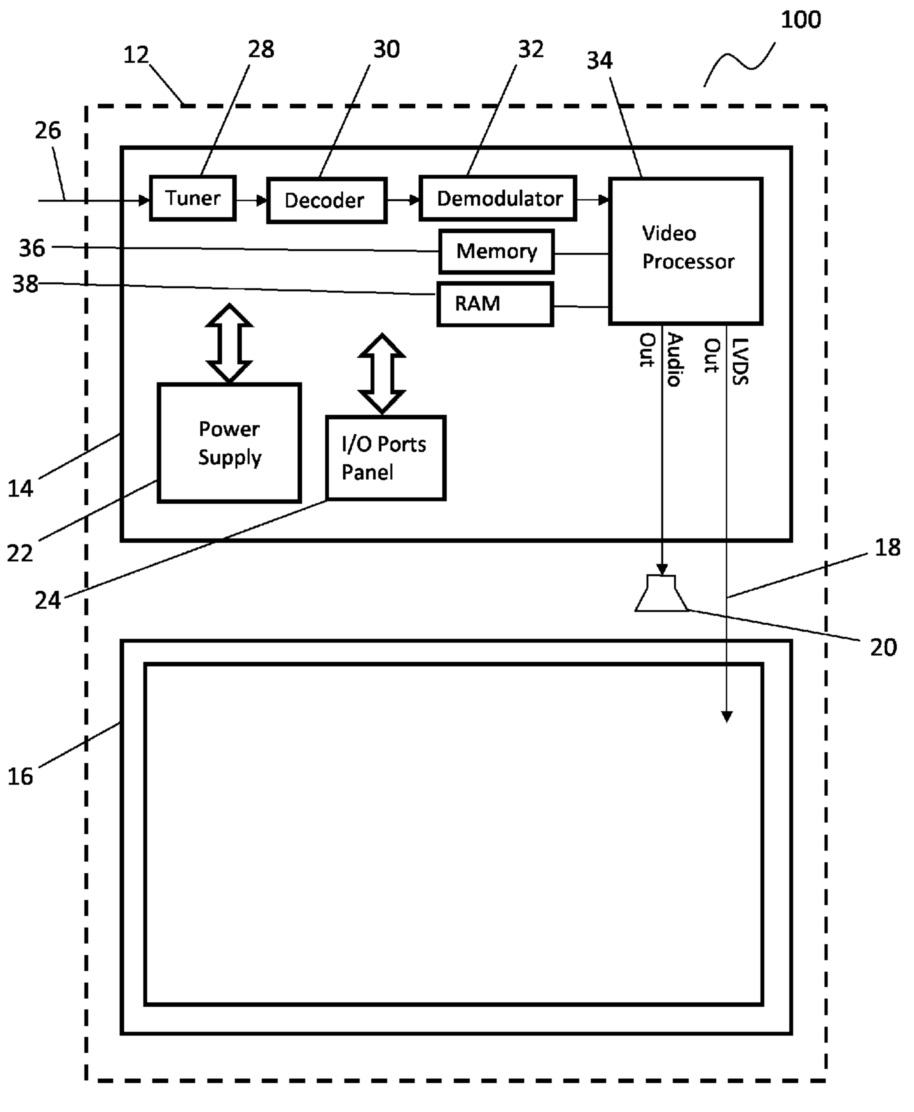
FIG. 1 illustrates a schematic block diagram of a display device.

FIG. 1 illustrates a schematic block diagram of a display device 10. Display device 10 includes a chassis 14 and a display panel 16. Chassis 14 comprises a printed circuit board (PCB) or in some embodiments, a plurality of PCB's. Chassis 14 is the guts of the display device and contains the electronics, electronic chips, circuit boards, and cables necessary to process the necessary input signals 26 into a signal 18 ready for display on display panel 16.

Display panel 16 may use any display technology including but not limited to LCD, PDP, electronic paper, or any other type of display technology. For example, an LCD display panel may consist of the LCD panel, electronics to operate the panel such as gate drivers, and a backlight. In certain embodiments the backlight may be comprised of light emitting diodes LEDs.

Both the chassis 14 and the display panel 18 are mounted in housing 12 to form display device 10. In operation, display device 10 receives a signal 26 from a content provider such as a satellite or cable provider. Chassis 14 decodes and formats signal 26 into output signal 18 designed for display on display panel 16. Display panel 16 receives signal 18 and displays the content on the display panel 18.

Figure 2:
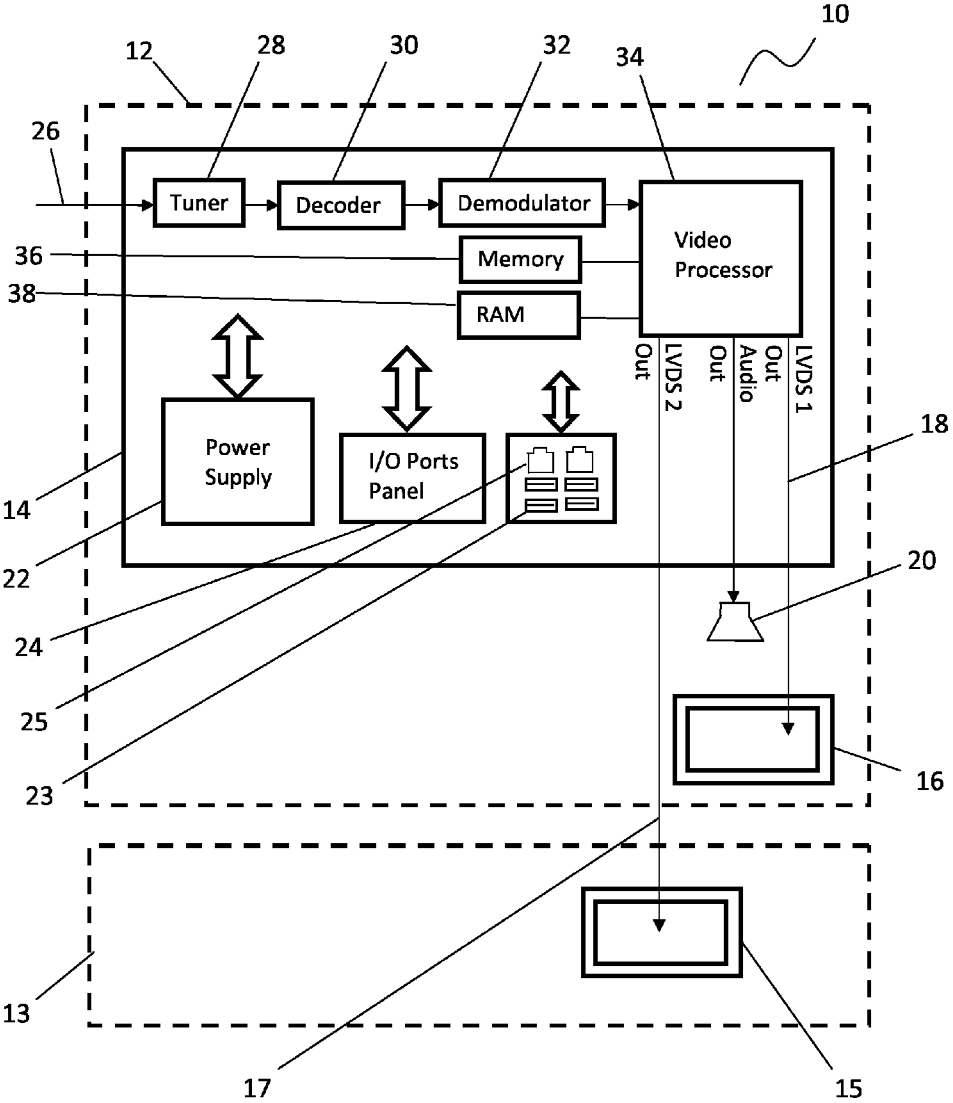
FIG. 2 illustrates a schematic block diagram of an embodiment of a multi-display device.

FIG. 2 illustrates a schematic block diagram of an embodiment of a multi-display device 100. Multi-display device 100 includes multiple display panels 15 and 16. Display panels 15 and 16 may use any technology and may be any size or shape. Preferably display panels are large enough to view an image from a reasonable distance. However, depending on the application, display panels 15 and 16 may be any appropriate size.

In the embodiment of FIG. 2, a single chassis 14 provides electronic support for both display panels 15 and 16. Chassis 14 outputs two separate output signals 17 and 18. FIG. 2 shows output signals 17 and 18 as low voltage differential signals (LVDS) 1 and 2. Low voltage differential signals are preferably used, however, other signal types may be used depending on the type of input the display panels 15 and 16 are formatted to accept.

FIG. 2 shows a single chassis 14 supporting two display panels 15 and 16, however in other embodiments, more than two display panels may be used. Using a single chassis 14 to provide a signal to multiple display panels may be advantageous for a number of reasons. Display panels are cheaper to manufacturer in smaller sizes. Consequently, manufacturing multiple smaller displays may be cheaper than using one larger display. Supporting multiple display panels with a single chassis 14 further adds to cost savings. A single chassis 14 may also consume less power than multiple chassis's and create less waste heat.

In the embodiment shown in FIG. 2, multiple LVDS signals, LVDS1 18 and LVDS2 17, are output from the single chassis 14. In the embodiment in FIG. 2, the single chassis supports outputting completely different LVDS signals 17 and 18 such that display device 100 is capable of simultaneously showing two completely different images, video streams, channels, or stations on each of the displays panels 15 and 16.

In addition to simultaneously showing content from two completely different sources on display panel 15 and 16, the embodiment of FIG. 2 also has the capability to split a single image across both screens so that the two display panels 15 and 16 display a single contiguous image across both display panels 15 and 16. However, the embodiment of FIG. 2 may also send two unrelated completely different video streams to each display panel 15 and 16.

In the embodiment of FIG. 2, each display panel 15 and 16 is arranged in a separate housing 12 and 13. In other embodiments, both display panels may be arranged in a single housing. In some embodiments, each of the display panels has its own individual housing while in other embodiments more than one display panel may share a single housing. In the embodiment of FIG. 2, the single chassis 14 is contained within housing 12. However in other embodiments, the single chassis 14 may be contained in a separate housing and only electrically connected to display panels 15 and 16.

In the preferred embodiment of FIG. 2, the single chassis 14 contains a single video processor 34. The single video processor is configured to support multiple output signals from multiple input sources. Having a single video processor that supports multiple output signals from multiple input signals is important to allow separate video streams to be viewed on each display panel 15 and 16. In the embodiment of FIG. 2, the output signals are LVDS 17 and 18.

Although FIG. 2 shows a single video processor, in other embodiments the single chassis 14 may contain more than one video processor 34. While some embodiments may use a single video processor 34 to transfer each input signal into an output signal, it is preferable that a single video processor supports more than one input and output signal. Because video processors 34 may be one of the more expensive components of multi-display device 100, using a single video processor 34 to support multiple input and output signals reduces the cost of manufacturing the multi-display device 100. In some embodiments, a multi-display device having more than two display panels may use more than one video processor 34 on a single chassis 14. Each video processor may support more than one output signal. For example, a multi-display device with four display panels may use two video processors 34, each with two output signals, on a single chassis 14.

The single chassis 14 may include non-volatile memory 36 for access by the video processor 34. Non-volatile memory 36 may be flash or micro-disk or any other type of memory suitable for storage of information. In addition, single chassis 14 may include volatile memory such as random access memory (RAM) 38 for use by the video processor 34. RAM 38 may be DDR, SDRAM, DIMM, SIMM or any other type of random access memory.

In the embodiment of FIG. 2, the single chassis 14 also includes Ethernet ports 25 and universal serial bus (USB) ports 23. Both the Ethernet ports 25 and the USB ports 23 may be arranged on the chassis and in digital communication with the video processor 34. Ethernet ports 25 may be used to provide Internet access to display device 100. Display device 100 may display content from the internet including websites, internet protocol television (IPTV) or any other content available on the Internet. In addition, Ethernet ports 25 may be used to support digital signage and the information related thereto.

In certain embodiments, the single chassis 14 may also include USB ports 23. Universal serial bus ports 23 allow the display device 100 to easily communicate with other electronics that support a USB connection. Supporting a USB connection with another digital device allows the display device 100 to easily and quickly display content from that device. For example, digital phones, digital music and video players, and cameras typically support USB connections and may quickly display their content on display device 100 through a USB connection. Other media such as memory cards, memory sticks, and other non-volatile memory may be supported through the USB ports 23. The USB ports 23 may also support connections to allow the display device 100 to support other functions such as digital signage.

In the embodiment of FIG. 2, the single chassis 14 is configured to accept a signal 26 from a cable or satellite provider and display one or more channels of signal 26 on the display panels 15 and 16. Signal 26 may contain digital and/or analog signals including both video and audio. However, signal 26 is often modulated and encoded. In the embodiment of FIG. 2, the single chassis 14 includes tuner 28, decoder 30, and demodulator 32 to preprocess signal 26 before sending it to the video processor 34.

The transmission of audio and video is primarily governed by standards in order to ensure compatibility. In most of North America including the United States, video is transmitted using the Advanced Television Systems Committee ATSC standard. ATSC uses the MPEG transport stream to encapsulate and send data. Before the display device 100 decodes the audio and video, the display device 100 must demodulate and apply error correction to the signal. Then, the transport stream may be demultiplexed into its constituent streams.

While ATSC is primarily used in North America, many other parts of the world use other standards including DVB/T (Europe and Asia), ISDB-T (South America), and DMB-T/H (China). Many of these standards use different modulation schemes. In addition, cable providers may use different modulation schemes within the ATSC standard including 8VSB, 16VSB and 256-QAM defined by the Society of Cable Telecommunication Engineers (SCTE).

To this end, some embodiments of the present patent document may have additional components on the single chassis 14 to support handling multiple input signals conforming to different standards or schemes. For example, in one embodiment more than one demodulator 32 is arranged on the single chassis 14 to demodulate different input signals based on different modulation standards. Embodiments with more than one demodulator 32 may display different signals from different countries on each of the display panels 15 and 16.

In some embodiments, the single chassis 14 may include multiple other components in addition to multiple demodulators 32. For example, the single chassis 14 may include multiple tuners 28 and/or decoders 30. The addition of multiple components such as tuners 28 and decoders 30 allow the display device 100 to more flexibly support displaying individual contents streams on display panels 15 and 16.

In the embodiment of FIG. 2, the single chassis 14 also includes a power supply 22. The power supply 22 supplies power to all the chips on the single chassis 14. In other embodiments the power supply 22 may supply power to the chassis 14 but be located off of the chassis 14.

In addition, the single chassis 14 may also include numerous additional Input/Output (I/O) ports. Input/Output ports may include HDMI, component video, DVI, VGA, SVGA, or any other type of video port. Input/Output ports may also include audio ports such as digital and analog audio. Signals coming in through the I/O ports may be routed to either display panel 15 or 16 via video processor 34.

In a preferred embodiment and as shown in FIG. 2, the single chassis 14 also supports audio to accompany the video. Video processor 34 may also output audio to speakers 20. The speakers 20 may be integrated into one or more housings 12 and/or 13. In other embodiments, the speakers 20 may not be included in multi-display device 10 and only an output audio signal is provide for output to other speakers.

In embodiments where multiple input signals are being handled that each contain audio, display device 100 may include the ability to allow selection of the audio stream to be broadcast by speakers 20. For example, the display device may mute one of the audio streams and only send the other audio stream to the speakers 20. The muted audio stream may be swapped at any time.

In other embodiments, display device 100 may have speakers mounted in each housing 12 and 13. In such an embodiment, display device 100 may be able to send individual audio signals to the speakers 20 in each of the housings 12 and 13. The displace device may also be able to swap the audio signals from one housing to the other and or individually mute each audio signal.

Figure 3:
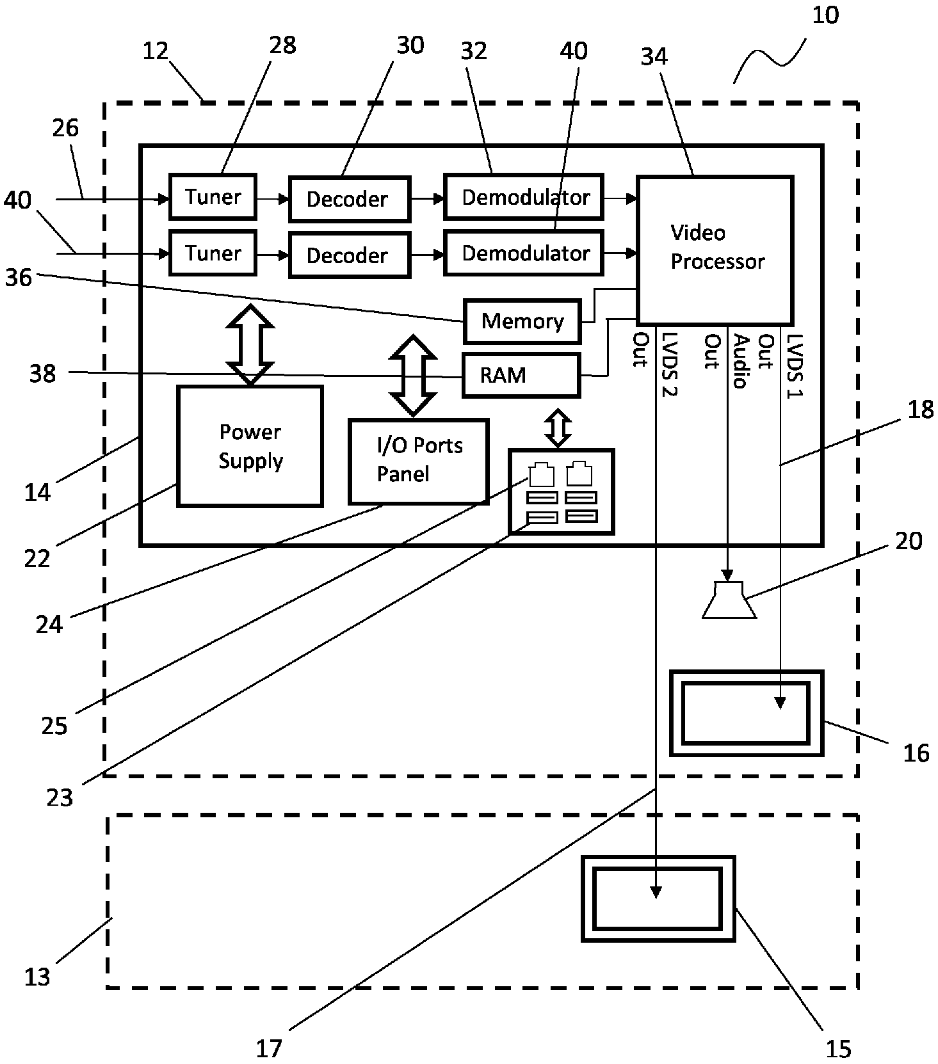
FIG. 3 illustrates a schematic block diagram of an embodiment of a multi-display device configured to accept signals multiple signals of varying standards.

FIG. 3 illustrates a schematic block diagram of an embodiment of a multi-display device configured to accept multiple signals of varying standards. The embodiment of FIG. 3 is similar to the embodiment of FIG. 2 except the embodiment of FIG. 3 has multiple tuners 28, multiple decoders 30, and multiple demodulators 32. Preferably, FIG. 3 may be used to decode and display multiple input signals 26 and 40 simultaneously on display panels 15 and 16. Input signals 26 and 40 may be encoded and/or modulated using different standards from different parts of the world or may be two separate signals of the same standard.

Although the embodiments of FIG. 2 and FIG. 3 show a video processor 34 with other chips present such as decoder 30 and demodulation 32, numerous functions may be integrated into video processor 34. Instead of just a video processor 34 and multiple other chips, embodiments of the present patent document may use a System On a Chip (SOC). SOCs incorporate additional functionality into a single chip such as the video processor chip 34. For example, the video processor or SOC 34 may perform numerous functions for the display device 100 including processing, scaling, deinterlacing, filtering, enhancement processing, contrast management, and display of user menus to name a few. In addition, some SOCs may perform the decoding and demodulation on the chip as well.

Figure 4A:
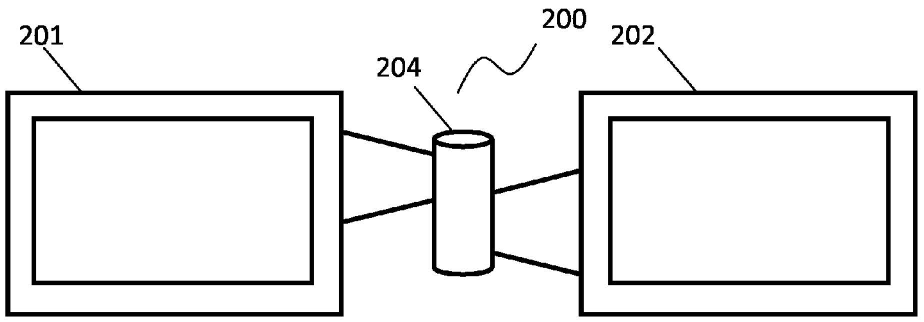
FIG. 4*a* illustrates a front view of an embodiment of a multi-display device with multiple display panels mounted on a pivotally connected backing structure and oriented side-by-side.

FIG. 4A illustrates a front view of an embodiment of a multi-display device 200 with multiple display panels mounted on a pivotally connected backing structure and oriented in a side-by-side configuration. Multi-display device 200 includes a backing structure with a pivotal mount member 204 and display panels 201 and 202. Because the multiple display panels 201 and 202 share a single chassis in multi-display device 200, the display panels 201 and 202 will be mounted in close proximity. Consequently in the preferred embodiment, a mounting system may be used to allow easy orientation of the display panels 201 and 202.

Figure 4B:
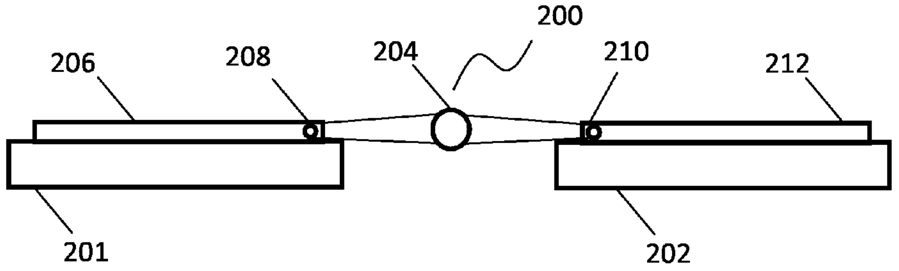
FIG. 4*b* illustrates a top view of an embodiment of a multi-display device with multiple display panels mounted on a pivotally connected backing structure and oriented side-by-side.

FIG. 4B illustrates a top view of an embodiment of a multi-display device 200 with multiple display panels 201 and 202 mounted on a pivotally connected backing structure and oriented side-by-side. In the embodiment of FIG. 4*b*, the backing structure includes a pivot point 204.

The backing structure of the embodiment of FIG. 4B includes members 208 and 210. Members 208 and 210 are slideably contained in slots 206 and 212 that run along the back of display panels 201 and 202. This allows the pivot member 204 to slide from between display panels 201 and 202 when the display panels are oriented side-by-side, to along side display panels 201 and 202 when the display panels are mounted one in front of the other.

Figure 4C:
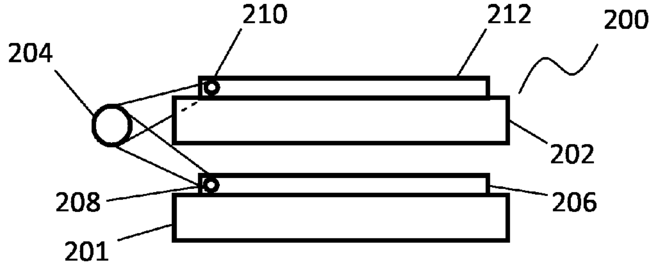
FIG. 4*c* illustrates a top view of an embodiment of a multi-display device with multiple display panels mounted on a pivotally connected backing structure and oriented one in front of the other.

FIG. 4C illustrates a top view of an embodiment of a multi-display device 200 with multiple display panels mounted on a pivotally connected backing structure and oriented one in front of the other. In the configuration and view of FIG. 4C, pivotal member 204 has moved off to the side of the display panels 201 and 202 and the panels are mounted in a one in front of the other configuration.

As may be seen by FIGS. 4B and 4C, only slot 206 is required in the embodiment as shown and member 210 is not required to slide along slot 212. In some embodiments, slot 212 is not needed and member 210 may be rigidly or pivotally connected to the backing structure without slot 212.

When a backing structure is used to support and connect display panels 201 and 202, electrical wiring may be run through the backing structure. For example, in the embodiment of FIGS. 4A, 4B, and 4C, the single chassis may be arranged in one of the housings behind display panel 201 or 202. The electrical wiring carrying the signal to the other display panel may be run through or inside the backing structure.

In one embodiment, display panels 210 and 202 may be moved manually from the side by side configuration shown in FIG. 4B to the one in front of the other configuration shown in FIG. 4C. In other embodiments, a motor or motors (not shown) may be provided in the backing structure to allow the display panels to change configurations automatically. For example, in one embodiment a motor may be provided within pivotal mount member 204 and another motor in communication with member 208 and slot 206 such that the multi-panel display device 200 may transition from the side by side configuration shown in FIG. 4B to the one in front of the other configuration shown in FIG. 4C.

The embodiment of FIG. 4 is just one possible method for mounting display panels 201 and 202. Numerous other multi-panel display configurations and backing structure designs are possible.

Figure 5:
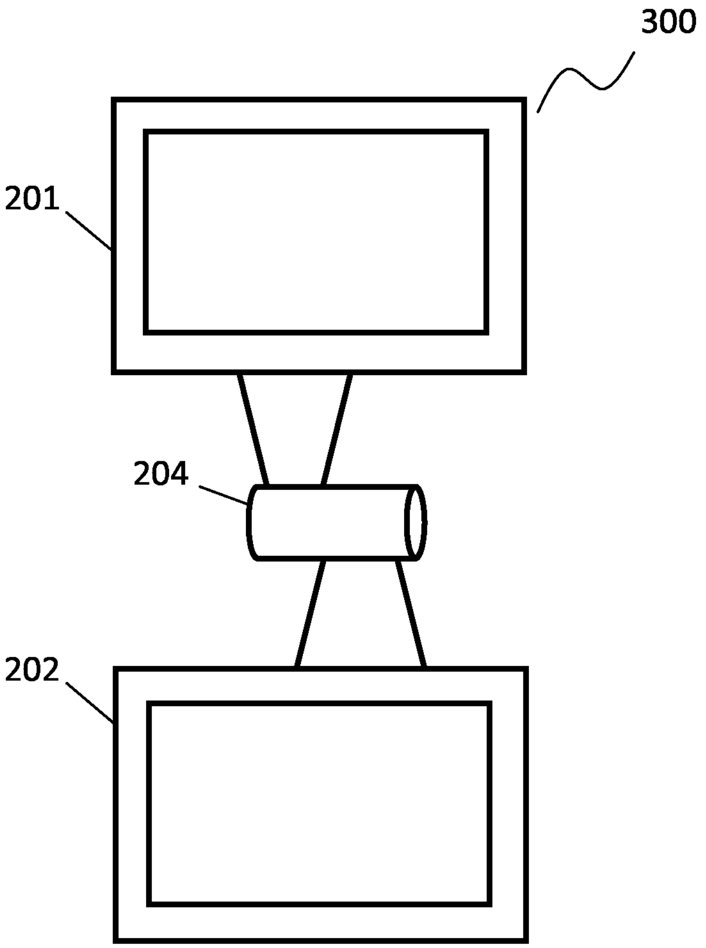
FIG. 5 illustrates a front view of an embodiment of a multi-display device with multiple display panels mounted on a pivotally connected backing structure and oriented one above the other.

FIG. 5 illustrates a front view of an embodiment of a multi-display device 300 with multiple display panels mounted on a pivotally connected backing structure and oriented one above the other. The embodiment of FIG. 5 is similar to the embodiment of FIG. 4A except the backing structure is configured to rotate the display panels 201 and 202 one above the other instead of side-by-side. Having a backing structure that allows the panels to be mounted one above the other is just one of the many variations possible with the backing structure of a multi-panel display.

Figure 6A:
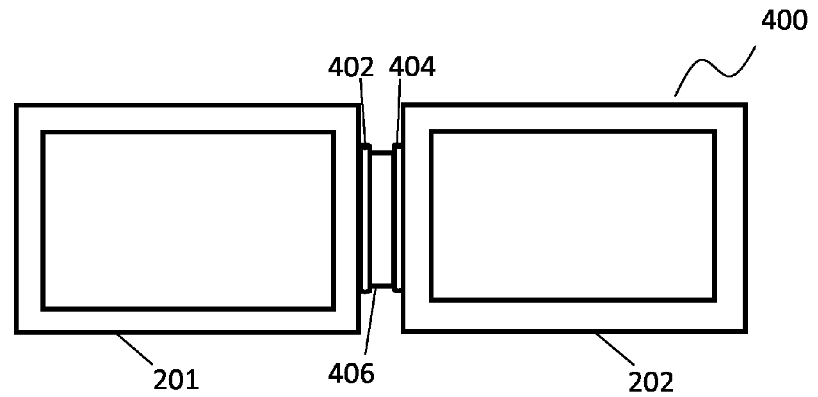
FIG. 6*a* illustrates a front view of an embodiment of a multi-display device with multiple display panels mounted on a pivotally connected backing structure and oriented side-by-side.

FIG. 6A illustrates a front view of an embodiment of a multi-display device 400 with multiple display panels mounted on a pivotally connected backing structure and oriented side-by-side. The embodiment of FIG. 6A is similar to the embodiment of 4A except the backing structure has a slightly different design. The backing structure of FIG. 6A uses multiple pivots 402 and 404 to allow the backing structure to better wrap around the display panels 201 and 202. In the embodiment of FIG. 6A, segment 406 spans the pivot points 402 and 404.

Figure 6B:
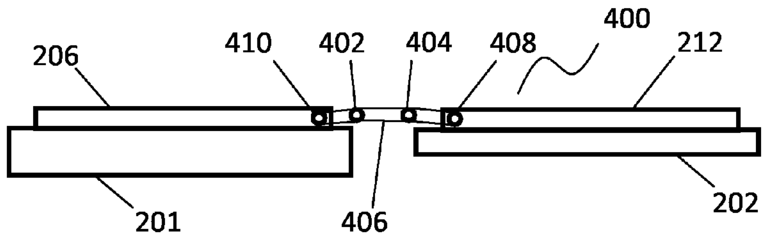
FIG. 6*b* illustrates a top view of an embodiment of a multi-display device with multiple display panels mounted on a pivotally connected backing structure and oriented side-by-side.

FIG. 6B illustrates a top view of an embodiment of a multi-display device 400 with multiple display panels mounted on a pivotally connected backing structure and oriented side-by-side. Similar to FIG. 4B, the embodiment of FIG. 6B shows the panels mounted in a side-by-side orientation. Also similar to the embodiment of FIG. 4B, the embodiment of FIG. 6B has slots that run along the length of the backing structure that allow member 408 and 410 to slideably attach.

While the embodiment of FIG. 6B has members 408 and 410 slideably attached, other embodiments have only one of member 408 or 410 slideably attached. For example, display panel 202 may be hard mounted to a wall and member 408 may be rigidly or pivotally attached to the backing structure. Display panel 201 could then still be oriented into a one in front of the other configuration by pivoting at 402 and 404 and sliding member 410 to the other side of slot 206. In such an embodiment, 212 does not need to be a slot at all and no addition backing structure may be needed.

Figure 6C:
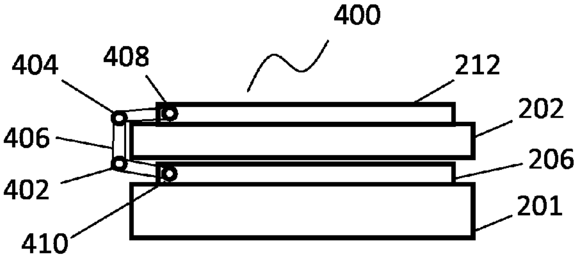
FIG. 6*c* illustrates a top view of an embodiment of a multi-display device with multiple display panels mounted on a pivotally connected backing structure and oriented one in front of the other.

FIG. 6C illustrates a top view of an embodiment of a multi-display device 400 with multiple display panels mounted on a pivotally connected backing structure and oriented one in front of the other. As may be seen by FIG. 6C, using multiple pivot points 402 and 406 gives the backing structure a smaller profile and allows the display panels 201 and 202 to be mounted more closely together than using a single pivot point. Although multi-display devices 200 and 400 use one pivot and two pivots respectively, any number of pivots may be used to allow the display panels to be mounted in the various orientations as shown in FIGS. 4-6.

Figure 7A:
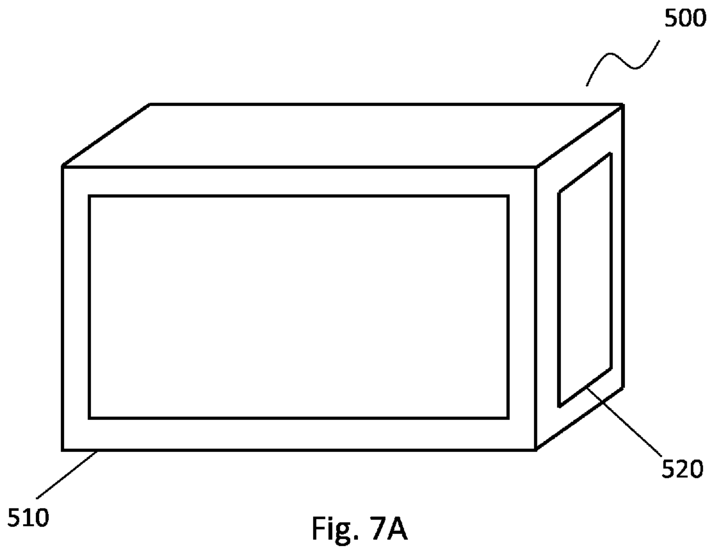
FIG. 7A illustrates an isometric view of an embodiment of a multi-display device with multiple display panels slideably attached wherein the second panel is in a stowed configuration.

FIG. 7A illustrates an isometric view of an embodiment of a multi-display device 500 with multiple display panels slideably attached wherein the second panel 520 is in a stowed configuration. In the embodiment of FIG. 7A, the displays are slideably connected to allow a second display 520 to slide out from behind a first display 510.

Figure 7B:
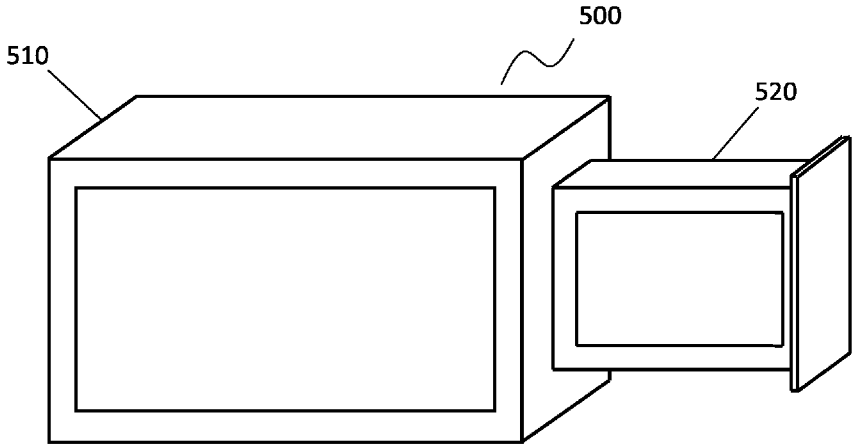
FIG. 7B illustrates an isometric view of the embodiment of a multi-display device of FIG. 7A with the second panel in a deployed configuration.

FIG. 7B illustrates an isometric view of the embodiment of a multi-display device 500 of FIG. 7A with the second panel 520 in a deployed configuration. Although in FIG. 7B the second panel 520 is deployed to the right of the first panel 510, the panels may deploy in other configurations. For example, the panels may deploy in a vertical manner so that the second display panel 520 is above the first display panel 510.

In the embodiment shown in FIG. 7B, the second panel 520 is smaller than the first panel 510. However in other embodiments, other relative sizes for the display panels 510 and 520 may be used. For example, the display panels may be the same size. One advantage of having the second display panel 520 smaller than the first display panel 510 is that the second display panel 520 may fit entirely inside the housing of the first display panel 510 and thus may be completely concealed in the stowed configuration as illustrated in FIG. 7A. However in other embodiments, the second display panel 520 may simply slide from behind the first display panel 510 such that the second display panel 520 is concealed only by the silhouette of the first display panel 510.

The second display panel 520 may be slideably connected to the first display panel 510 using any number of methods. In the preferred embodiment, a bearing and rail system is used. However, other methods of slideably connecting two items may be used. For example, the second display panel 520 may be connected to the first display panel 510 using castors and rails, track mounts, roller bearings, or any other type of connection that allows relative motion.

Although the embodiments have been described with reference to preferred configurations and specific examples, it will readily be appreciated by those skilled in the art that many modifications and adaptations of the multi-display device and methods therefore described herein are possible without departure from the spirit and scope of the embodiments as claimed hereinafter. Thus, it is to be clearly understood that this description is made only by way of example and not as a limitation on the scope of the embodiments as claimed below.

What is claimed is:

1. A multi-display device comprising:

a plurality of display panels wherein each display panel is arranged in a housing;

a single chassis arranged within one of the housings;

a first digital demodulator arranged on the chassis and configured to demodulate a first video signal from a first external input port receiving a first external signal and to output the first video signal to a single video processor;

a second digital demodulator arranged on the chassis and configured to demodulate a second video signal from a second external input port receiving a second external signal to output the second video signal to the single video processor; and the single video processor arranged within the chassis and configured to receive a plurality of video signals from a plurality input ports comprising the first input port and the second input port and output the first video signal from the first input port to a first display panel of the plurality of display panels and the second video signal from the second input port to a second display panel of the plurality of display panels;

wherein the first digital demodulator and the second digital demodulator are configured to demodulate different modulation schemes.

2. The multi-display device of claim 1, further comprising a plurality of inputs arranged on at least one housing wherein the single video processor is configured to allow selective output of the plurality of inputs to each of the plurality of display panels.

3. The multi-display device of claim 1, further comprising:

a first plurality of inputs arranged on at least one housing and configured to output to a first display panel; and a second plurality of inputs arranged on the at least one housing and configured to output to a second display panel.

4. The multi-display device of claim 1, further comprising a mechanical backing structure having a first display mounted thereon, wherein the mechanical backing structure includes a pivotally connected portion with a second display mounted thereon and wherein, the pivotally connected portion is configured to allow the first and second display panels to be oriented in a side-by-side configuration and to allow the first and second display panels to be oriented in a one in front of the other configuration.

5. The multi-display device of claim 1, further comprising a mechanical backing structure having a first display mounted thereon, wherein the mechanical backing structure includes a pivotally connected portion with a second display mounted thereon and wherein, the pivotally connected portion is configured to allow the first and second display panels to be oriented in a one above the other configuration and to allow the first and second display panels to be oriented in a one in front of the other configuration.

6. The multi-display device of claim 1, wherein the plurality of display panels includes a first liquid crystal display panel and a second liquid crystal display panel.

7. The multi-display device of claim 1 wherein the plurality of input ports are video input ports configured to receive video signal from a video source external to the housing.

8. A multi-display device comprising:

a first display panel arranged in a first housing;

a second display panel arranged in a second housing; and a single chassis arranged within the first housing;

a first digital demodulator arranged on the chassis and configured to demodulate a first video signal from a first external input port receiving a first external signal and to output the first video signal to a single system on a chip;

a second digital demodulator arranged on the chassis and configured to demodulate a second video signal from a second external input port receiving a second external signal and to output the second video signal to the single system on a chip; and the single system on a chip arranged on the chassis configured to receive a plurality of video signals from a plurality input ports and output the first video signal corresponding to the first input port to the first display panel and the second video signal corresponding to the second input port to the second display panel;

wherein the first digital demodulator and the second digital demodulator are configured to demodulate different modulation schemes.

9. The multi-display device of claim 8, further comprising a plurality of inputs arranged on the first housing wherein the single system on a chip is configured to allow selective output of the plurality of inputs to the first display panel and the second display panel.

10. The multi-display device of claim 1, further comprising:

a first plurality of inputs arranged on the first housing and configured to output to the first display panel through the system on a chip; and a second plurality of inputs arranged on the first housing and configured to output to a second display panel through the system on a chip.

11. The multi-display device of claim 8, further comprising a mechanical backing structure having a first display mounted thereon, wherein the mechanical backing structure includes a pivotally connected portion with a second display mounted thereon and wherein, the pivotally connected portion is configured to allow the first and second display panels to be oriented in a side-by-side configuration and to allow the first and second display panels to be oriented in a one in front of the other configuration.

12. The multi-display device of claim 8, further comprising a mechanical backing structure having a first display mounted thereon, wherein the mechanical backing structure includes a pivotally connected portion with a second display mounted thereon and wherein, the pivotally connected portion is configured to allow the first and second display panels to be oriented in a one above the other configuration and to allow the first and second display panels to be oriented in a one in front of the other configuration.

13. The multi-display device of claim 8, wherein the first display panel is a first liquid crystal display panel and the second display panel is a second liquid crystal display panel.

14. A method of supporting multiple displays comprising the steps of:

receiving two or more multiplexed input video signals each from a separate external source by a single chassis contained within a first display housing;

demultiplexing at least one video signal of the two or more multiplexed input video signals into a plurality of video signals comprising a first video signal and a second video signal;

demodulating the first video signal with a first demodulator and output the first video signal to a single video processor;

demodulating the second video signal with a second demodulator and output the second video signal to the single video processor;

outputting, from the single video processor, a first video signal to a first display panel from the single chassis; and outputting, from the single video processor, a second video signal to a second display panel from the single chassis;

wherein the first digital demodulator and the second digital demodulator are configured to demodulate different modulation schemes.

15. The method of claim 14, wherein the chassis processes the first video signal and the second video signal with a single video processor.

* * * * *

UNITED STATES PATENT AND TRADEMARK OFFICE

CERTIFICATE OF CORRECTION

PATENT NO. : 9,083,926 B2
APPLICATION NO. : 12/911460
DATED : July 14, 2015
INVENTOR(S) : Nejat et al.

It is certified that error appears in the above-identified patent and that said Letters Patent is hereby corrected as shown below:

On the TITLE PAGE:
Under item (56), Column 2, OTHER PUBLICATIONS, line 2, delete “allbaba” and insert --alibaba--.
In the CLAIMS:
Claim 1, column 9, line 48, after “plurality” insert --of--.
Claim 8, column 10, line 42, after “plurality” insert --of--.

Signed and Sealed this
Twenty-second Day of March, 2016

Michelle K. Lee
*Director of the United States Patent and Trademark Office*